No. 626,115. Patented May 30, 1899.
A. VON AUW.
MACHINE FOR MAKING CENTER STITCHED BOOKS.
(Application filed Mar. 11, 1898.)
(No Model.) 10 Sheets—Sheet 1.
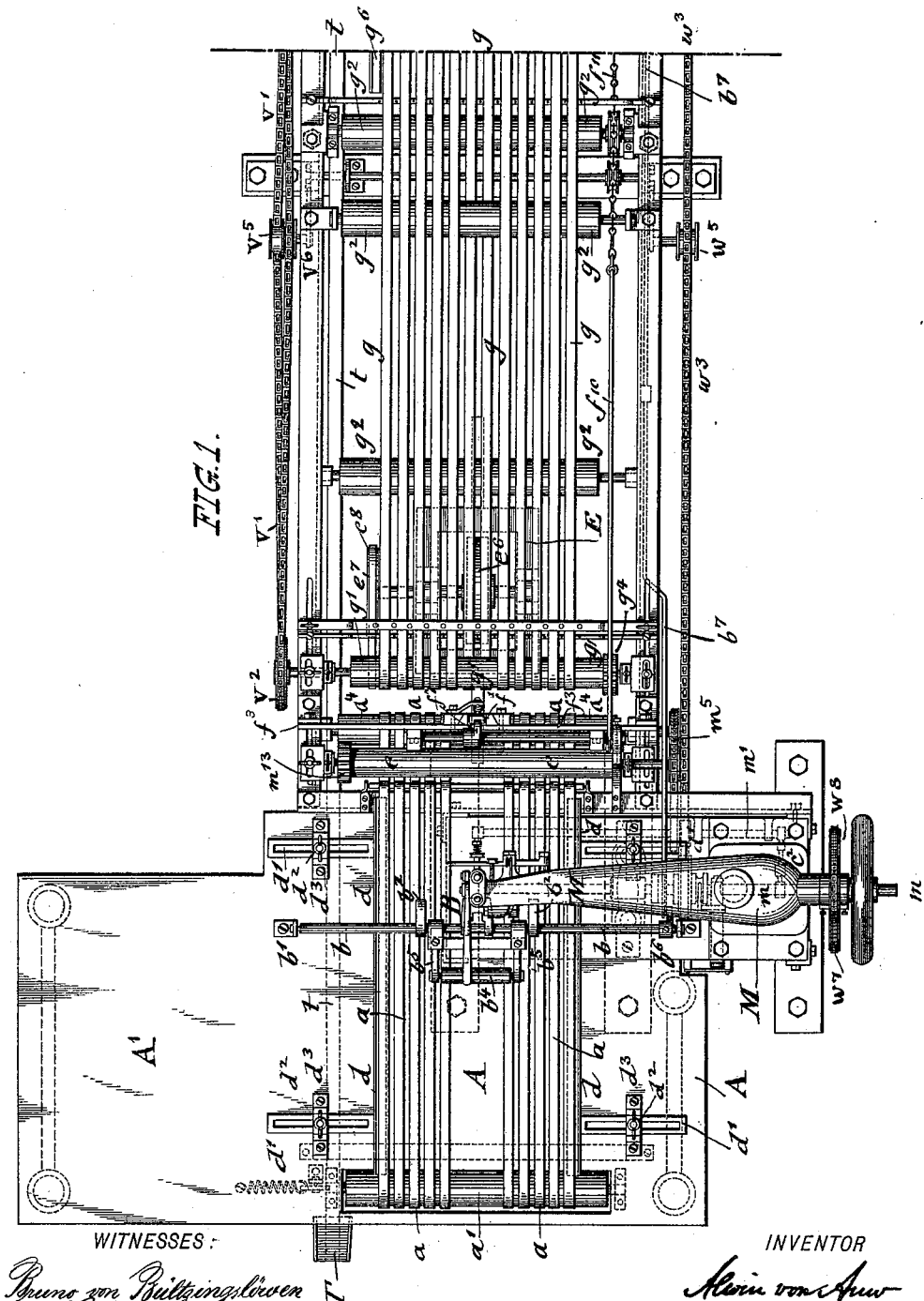
WITNESSES: INVENTOR No. 626,115. Patented May 30, 1899.
A. VON AUW.
MACHINE FOR MAKING CENTER STITCHED BOOKS.
(Application filed Mar. 11, 1898.)
(No Model.) 10 Sheets—Sheet 2.
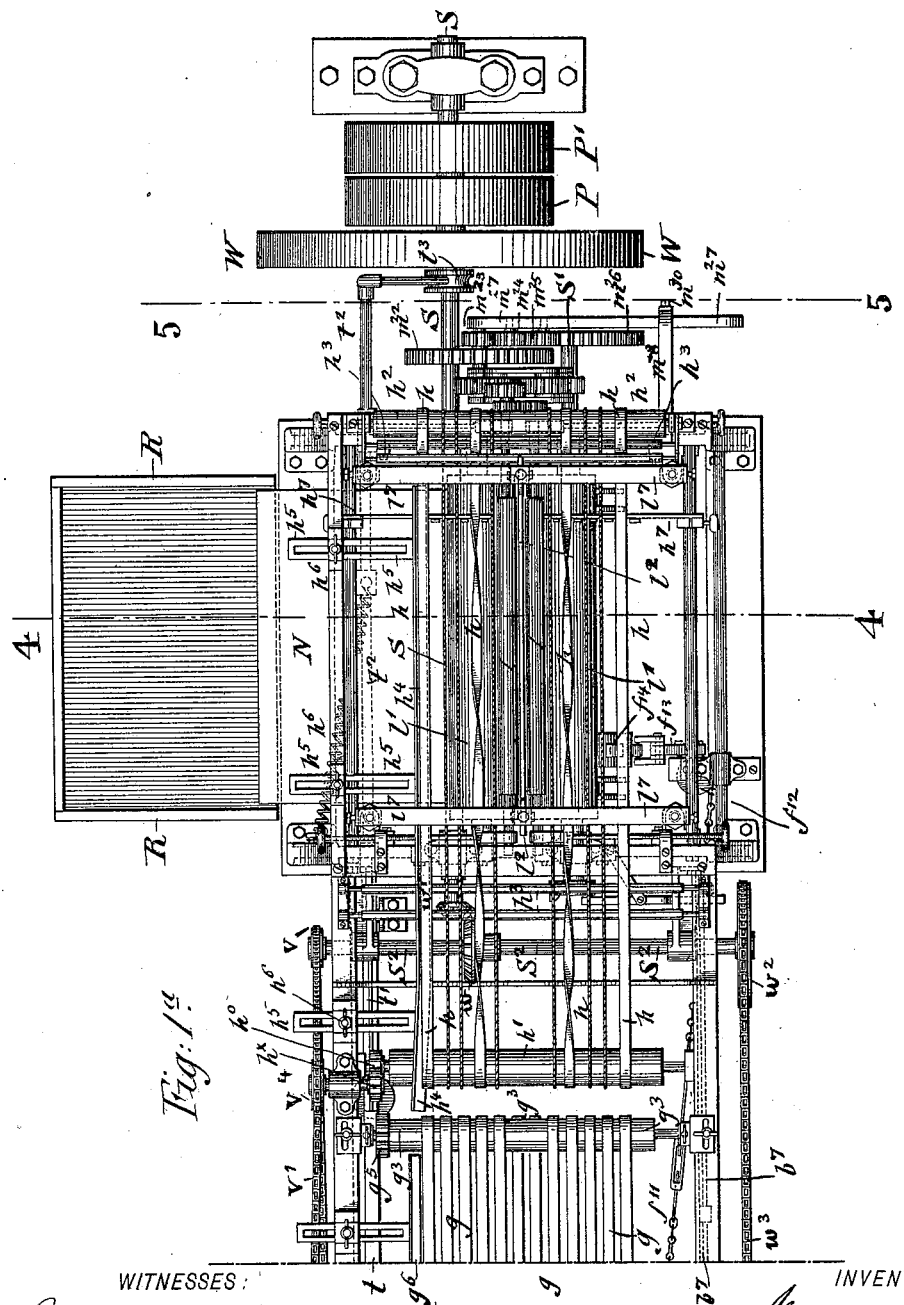
WITNESSES:
INVENTOR
Alwin von Auw
BY
ATTORNEYS.

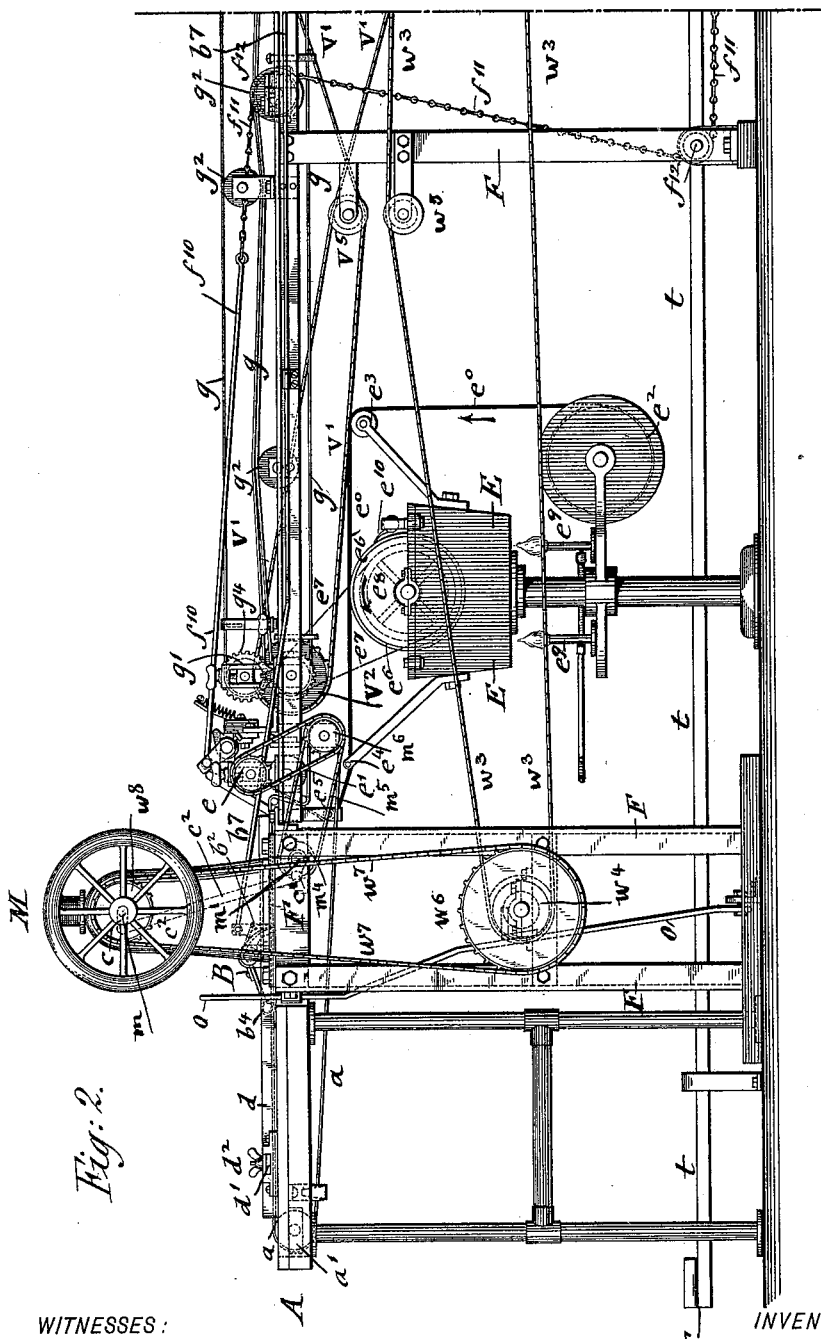

No. 626,115. Patented May 30, 1899.
A. VON AUW.
MACHINE FOR MAKING CENTER STITCHED BOOKS.
(Application filed Mar. 11, 1898.)
(No Model.) 10 Sheets—Sheet 4.
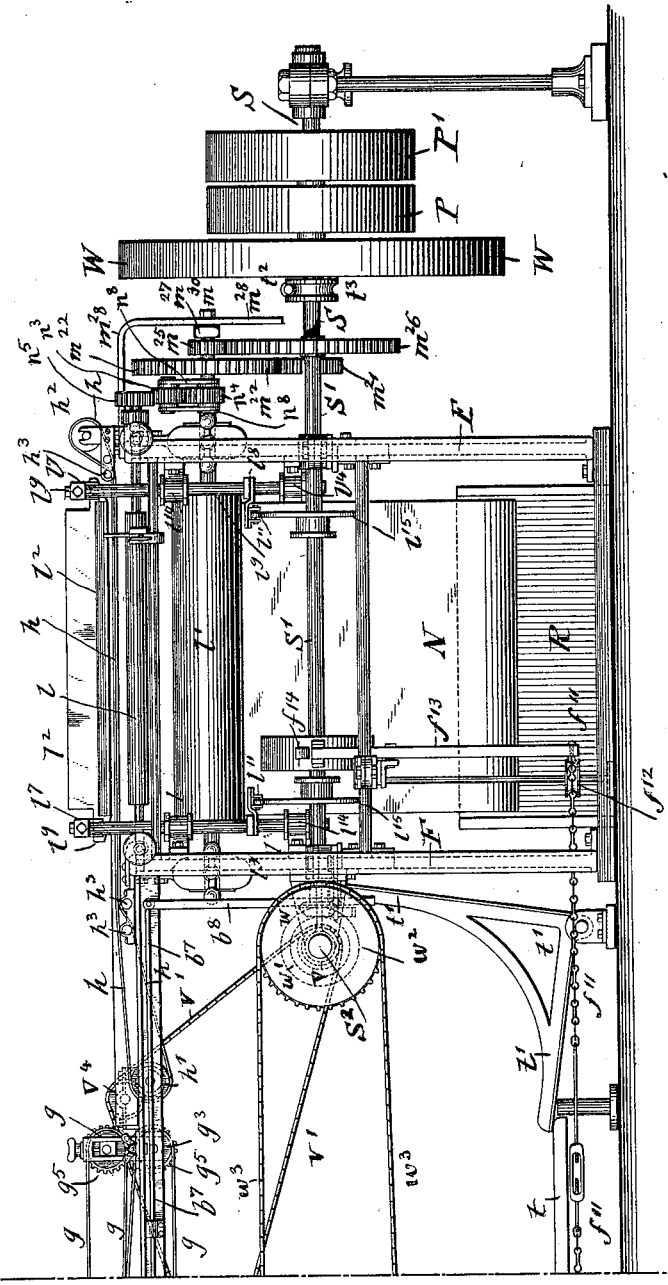

No. 626,115. Patented May 30, 1899.
A. VON AUW.
MACHINE FOR MAKING CENTER STITCHED BOOKS.
(Application filed Mar. 11, 1898.)
(No Model.) 10 Sheets—Sheet 5.
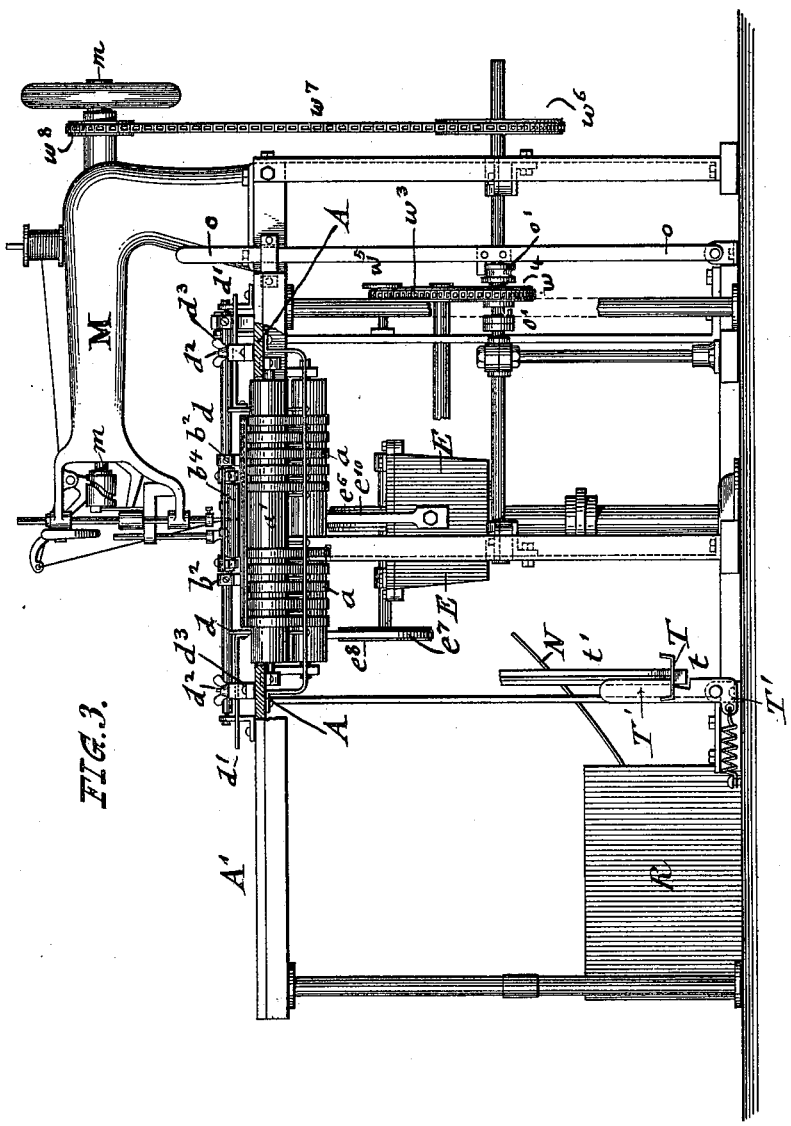
WITNESSES: INVENTOR
 Alwin von Auw
BY
 ATTORNEYS.

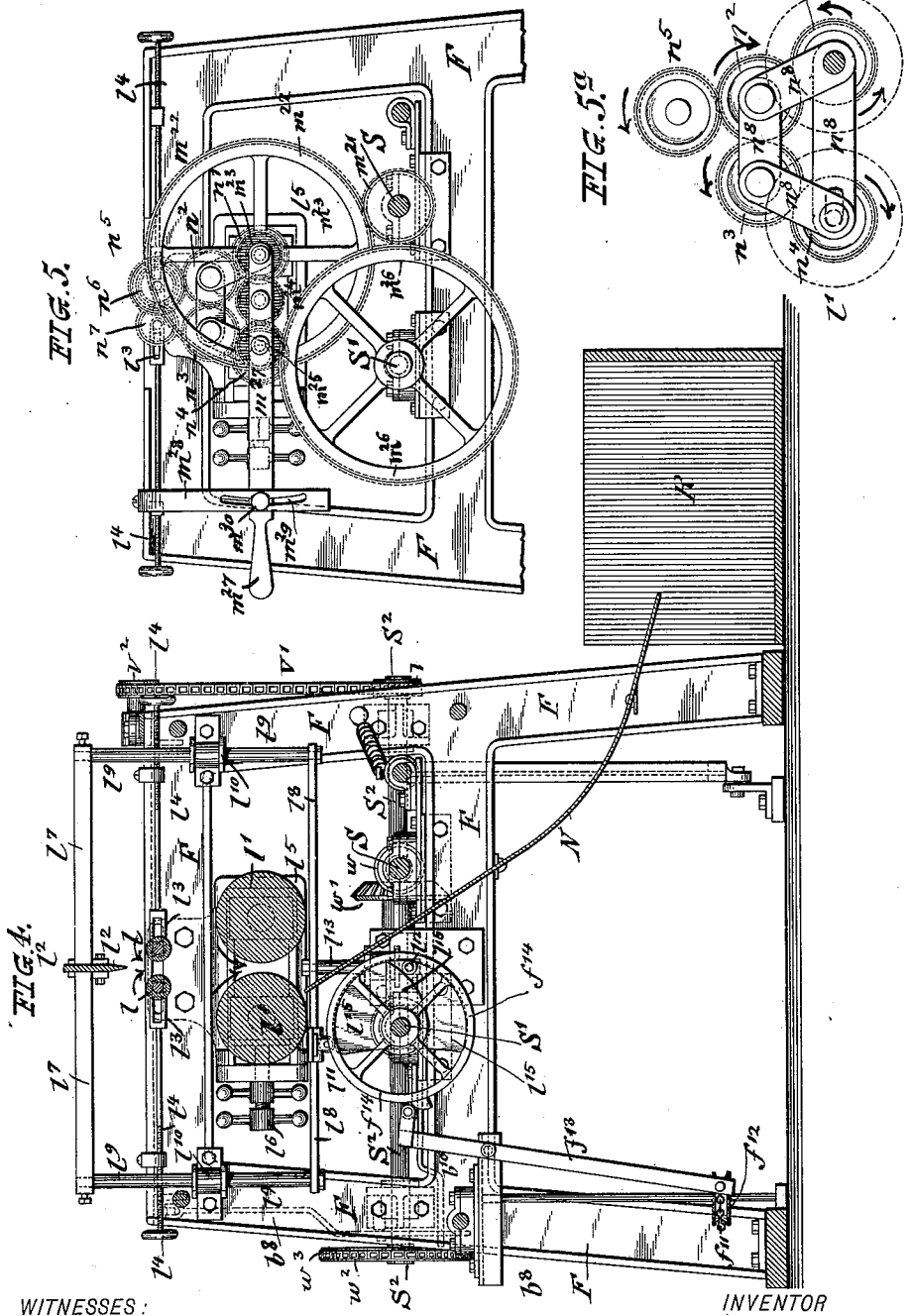

No. 626,115. Patented May 30, 1899.
A. VON AUW.
MACHINE FOR MAKING CENTER STITCHED BOOKS.
(Application filed Mar. 11, 1898.)
(No Model.) 10 Sheets—Sheet 7.
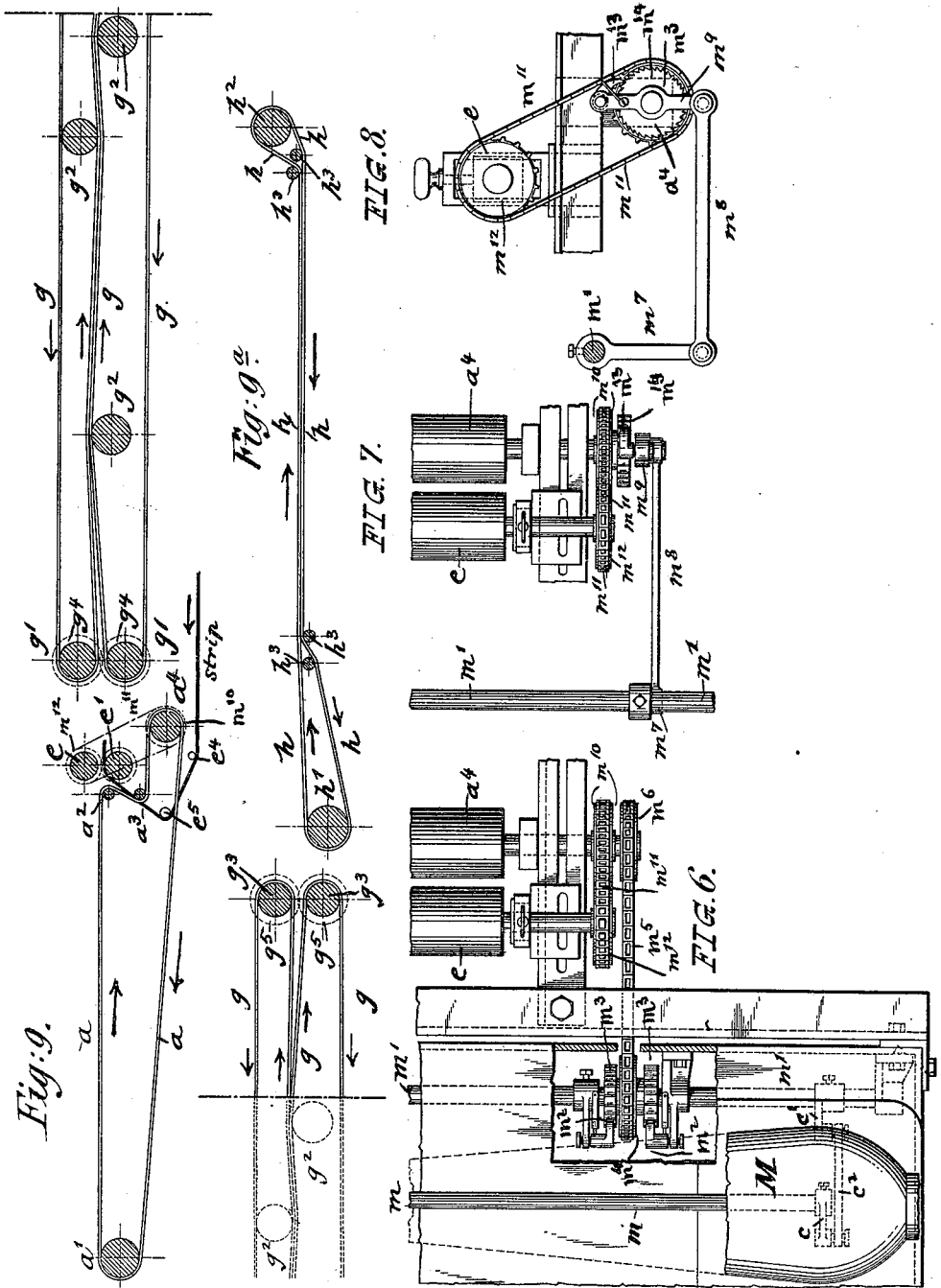

No. 626,115.  
A. VON AUW.  
Patented May 30, 1899.
MACHINE FOR MAKING CENTER STITCHED BOOKS.
(Application filed Mar. 11, 1898.)
(No Model.)
10 Sheets—Sheet 8.
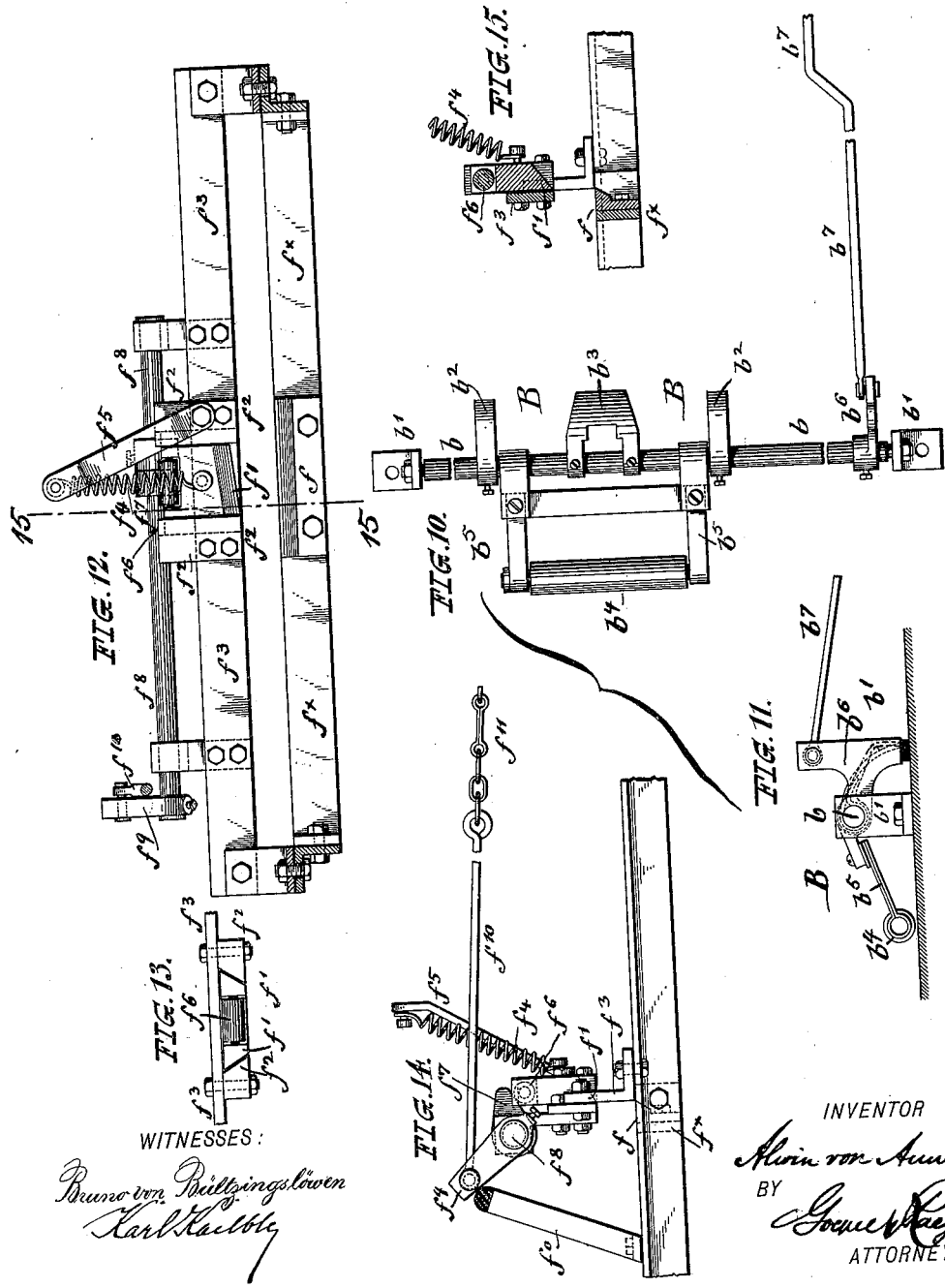

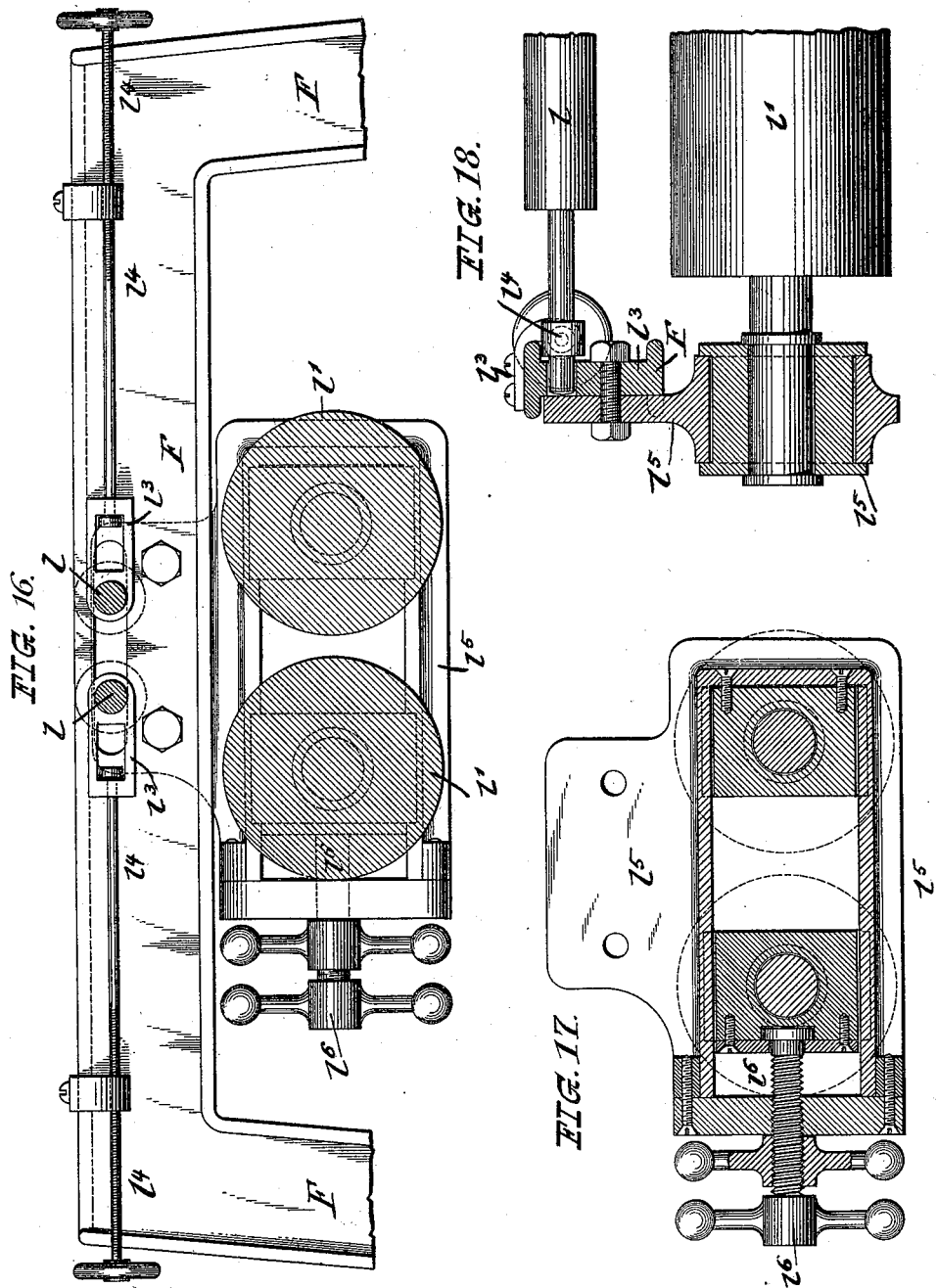

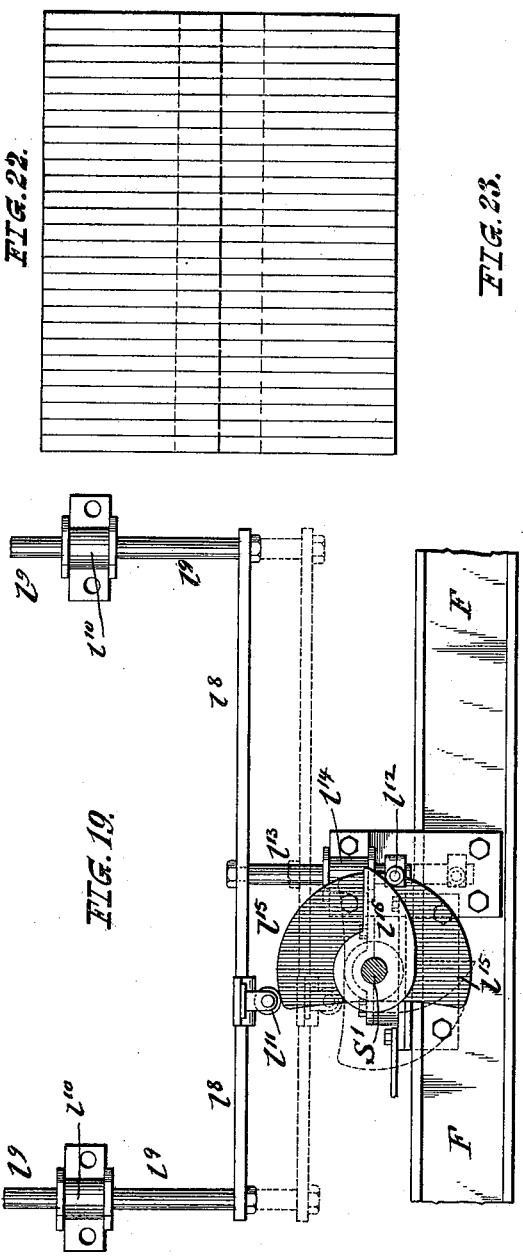

UNITED STATES PATENT OFFICE.

ALWIN VON AUW, OF NEW YORK, N. Y., ASSIGNOR TO SARAH A. VON AUW, OF SAME PLACE.

MACHINE FOR MAKING CENTER-STITCHED BOOKS.

SPECIFICATION forming part of Letters Patent No. 626,115, dated May 30, 1899.

Application filed March 11, 1898. Serial No. 673,476. (No model.)

*To all whom it may concern:*

Be it known that I, ALWIN VON AUW, a citizen of the United States, residing at New York, in the borough of Manhattan and State of New York, have invented certain new and useful Improvements in Machines for Making Center-Stitched Books, of which the following is a specification.

This invention relates to an improved machine for making center-stitched books—such as memorandum-books, pass-books, composition-books, and such other books that are sewed in the center—by which the stitching of the book, the gluing onto the cover of a suitable binding or covering material, the cutting off of the stitching-thread and binding or covering material, and the folding of the book are accomplished by the continuous and automatic operation of a machine, so as to dispense to a great extent with hand labor in making these books and permit thereby the manufacture of these books at a considerable saving in time and labor; and the invention consists of a machine for making center-stitched books which comprises an organized sewing-machine for center-stitching a pile of sheets or leaves forming the signature of the book, a primary set of endless tapes for feeding the book to the sewing-machine, means for arresting the signature until it is ready to be fed to the sewing-machine, means for feeding the binding or covering material to the back of the book and gluing it thereto, means for cutting off the stitching-threads and binding or covering material from each book, an intermediate double set of endless tapes for taking hold of the stitched book and carrying it forward to the folding devices, a third set of endless tapes for taking up and presenting the stitched book to the folding devices, adjustable gages for guiding the book, folding devices for folding the book at the center, and means for delivering the folded book to a suitable receptacle, as will be fully described hereinafter and finally pointed out in the claims.

In the accompanying drawings, Figures 1 and 1ª represent a plan view of my improved machine for making center-stitched books, Fig. 1 representing the left-hand end and Fig. 1ª the right-hand end of the machine. Figs. 2 and 2ª are a side elevation of the machine, corresponding to Figs. 1 and 1ª. Fig. 3 is an elevation of the ingoing end of the machine, showing the organized sewing-machine for stitching the piled sheets or leaves and the primary set of endless tapes for feeding them to the sewing-machine. Fig. 4 is a vertical transverse section on line 4 4, Fig. 1ª, showing the folding devices and the chute for conducting the finished book to a suitable receptacle. Fig. 5 is a vertical transverse section on line 5 5, Fig. 1ª, showing the gear-wheel mechanism for transmitting motion to the feed and pressure rollers of the folding devices. Fig. 5ª is a detail elevation of a portion of the motion-transmitting gear-wheels drawn on a larger scale. Fig. 6 is a plan view showing the mechanism for imparting intermittent or step-by-step motion from the shaft of the sewing-machine to the pressure-rollers, by which the stitched book is taken up and the binding or covering material applied after it leaves the sewing-machine, also to the primary set of endless tapes, said rollers and tapes being moved in unison with the feed motion of the sewing-machine. Figs. 7 and 8 are respectively a plan view and a side elevation of a modified form of mechanism for transmitting intermittent or step-by-step motion from the shaft of the sewing-machine to the feed-rollers and primary tapes. Figs. 9 and 9ª represent a vertical longitudinal section of a diagram for illustrating the three sets of endless tapes by which the piled leaves or sheets are fed to the sewing-machine and from the same to the folding devices. Fig. 10 is a plan view of the stop device for arresting the sheets or leaves before they are fed to the sewing-machine. Fig. 11 is a side elevation of the mechanism shown in Fig. 10. Fig. 12 is a detail front elevation of the mechanism for cutting off the stitching-threads and the binding or covering material of the book. Fig. 13 is a detail plan view of the knife-carrier and its guideways. Fig. 14 is a side elevation of the cutting mechanism shown in Fig. 12. Fig. 15 is a vertical transverse section on line 15 15, Fig. 12. Figs. 16, 17, and 18 are respectively details of the feed and pressure rollers of the devices for folding the stitched book. Fig. 19 is a detail side elevation showing the cams for operating the folding-blade. Figs. 20 and 21 are respectively a plan view and a side elevation of the mechanism for operating the stop device at the proper time; and Figs. 22, 23, and 24 represent, respectively, a plan of the stitched sheets or leaves before folding, an end view of the stitched book in the act of being folded, and a perspective view of the finished book.

Similar letters of reference indicate corresponding parts.

My improved machine for making center-stitched books consists of five main parts—first, an organized sewing-machine by which the piled sheets or leaves are stitched, in connection with the mechanism for intermittently feeding said leaves to the sewing-machine; secondly, mechanism by which the binding or covering material is fed to and applied to the back of the stitched sheets or leaves; thirdly, mechanism for cutting off the stitching-threads and binding or covering material; fourthly, an intermediate set of endless feed-tapes by which the stitched book, with its binding or covering material, is taken hold of and conducted forward for a sufficient distance to permit the drying of the binding or covering material, and, fifthly, mechanism by which the stitched book, with its binding or covering material, is folded up along its center line.

The mechanisms described are arranged longitudinally in line with each other and supported by a frame F of suitable construction, the moving parts receiving their motion from a main shaft S, which is provided with a fly-wheel W and a fixed pulley P and a loose pulley P', to the former of which motion is transmitted by a belt from an overhead shaft in the usual manner. The main shaft S is supported in suitable journal-bearings and extends longitudinally through the rear part of the machine on which the folding devices are arranged. It transmits rotary motion by a suitable change-gear $m^{21}$ $m^{22}$ $m^{23}$ $m^{24}$ $m^{25}$ $m^{26}$ to a cam-shaft S', which is supported in suitable bearings of a frame F parallel with the main shaft S and which carries the cams for actuating the stop mechanism for the piled sheets, the cutting-off mechanism for the stitching-threads and binding or covering material, and the vertically-reciprocating folding-blade. The gear-wheel $m^{26}$ at the end of the cam-shaft S' is so proportioned that it conforms with the length of the book to be sewed. For different lengths of books the gear-wheel $m^{26}$ is interchanged for a larger or smaller gear-wheel, so that the motions of the stop device, cutting-off attachment, and folding-blade are properly timed. The gear-wheels $m^{22}$ and $m^{23}$ are placed on an intermediate shaft, to which a lever $m^{27}$ is pivoted, which carries the intermediate gears $m^{24}$ $m^{25}$. The lever $m^{27}$ can be clamped into higher or lower position on a supporting-bracket $m^{28}$ by means of an arc-shaped slot $m^{29}$ in said bracket and a clamping-screw $m^{30}$. When it is desired to change the gear-wheel $m^{26}$, the lever $m^{27}$, with its gears $m^{24}$ $m^{25}$, is clamped into raised position on the bracket, so as to permit the convenient interchange of the gear-wheel $m^{26}$ on the end of the cam-shaft S', said lever being clamped into lower position after the interchanging of the gear-wheel $m^{26}$ is accomplished, so that the gear $m^{25}$ is placed again in proper mesh with the gear-wheel $m^{26}$ for transmitting the required motion to the shaft S'.

Motion is transmitted from the forward end of the main shaft S to the sewing-machine, primary set of tapes, intermediate sets of tapes, and third set of tapes by means of bevel-gears $w$ $w'$ and transverse shaft $S^2$, from which motion is transmitted by a sprocket-wheel $w^2$ at one end and an endless sprocket-chain $w^3$ to a sprocket-wheel $w^4$, the shaft of which is supported below the main shaft of the sewing-machine. The sprocket-chain $w^3$ is guided over a stretching-pulley $w^5$ at a point between the sprocket-wheels $w^2$ $w^4$. From the shaft of the sprocket-wheel $w^4$ motion is transmitted by a second sprocket-wheel $w^6$ on said shaft and a sprocket-chain $w^7$ to a sprocket-wheel $w^8$ on the main shaft $m$ of the sewing-machine, as shown clearly in Figs. 1 and 1ª and 2 and 2ª. To the opposite end of the transverse shaft $S^2$ is likewise applied a sprocket-wheel $v$, which transmits motion by a crossed sprocket-chain $v'$ to a sprocket-wheel $v^2$ on the shaft of the drive-roller of the intermediate set of endless tapes, the sprocket-chain $v'$ being guided over intermediate pulleys $v^5$ and $v^6$, as shown in Figs. 1 and 1ª and 2 and 2ª.

*The book-sewing machine.*—At the ingoing end of the machine is arranged an organized sewing-machine M, which is preferably of the well-known Singer type, such as is used by bookbinders for center-stitching books. The sewing-machine M is supported on a table A, which is supported in any suitable manner and which is extended at one side, the extension A' serving for the purpose of arranging the piles of sheets or leaves which are required for making up the books. At each side of the needle of the sewing-machine M and equidistantly therefrom is arranged a primary set of endless feed-tapes $a$, which is guided over suitable carrying-rollers $a'$ $a^2$ $a^3$ $a^4$ and which receives intermittent or step-by-step rotary motion in the direction of the arrows (shown in the diagram Fig. 9) from the main shaft $m$ of the sewing-machine, an intermediate rock-shaft $m'$, operated by cranks $c$ $c'$ on the shafts $m$ $m'$, and a connecting-rod $c^2$ between the same, and a sprocket-wheel-and-chain transmission between said rock-shaft $m'$ and the drive-roller $a^4$ of the primary set of tapes $a$ $a$. Either the driving mechanism shown in Fig. 6 or the driving mechanism shown in Figs. 7 and 8 may be employed for transmitting the rotary motion of the main shaft $m$ of the sewing-machine by the intermediate rock-shaft $m'$ to the drive-roller $a^4$. In Fig. 6 a suitable pawl-and-ratchet mechanism $m^2$ $m^3$ and a sprocket-wheel and chain transmission $m^4$ $m^5$ $m^6$ is employed, while in Figs. 7 and 8 a crank-and-lever mechanism $m^7$ $m^8$ $m^9$ and a pawl-and-ratchet mechanism $m^{13}$ $m^{14}$ are employed, the object of these driving mechanisms being to move the tapes at the same speed as the feed motion of the sewing-machine and feed thereby the piled leaves toward the stop mechanism and the stitching devices of the sewing-machine. Before the pile of leaves is fed to the needle of the sewing-machine M it is held for a short time in position to be fed to the sewing-machine by a stop mechanism B, which is shown in Figs. 1, 2, 10, and 11, and which consists of an auxiliary shaft $b$, which is supported in bearings $b'$ and to which are attached downwardly-bent stops $b^2$. These stops $b^2$ are in their lower position long enough to detain the advancing pile of sheets, so that a space will be formed between the same and the pile which has been stitched. This space allows the proper working of the knives of the cutting-off mechanism for the binding or covering material, which is severed, as hereinafter described, between the stitched signatures. Intermediately between the bent stops $b^2$ is applied to the shaft $b$ a flat downwardly-extending spring $b^3$, which presses the piled leaves down, so that they cannot catch over the presser-foot of the sewing-machine. At the opposite side of the shaft $b$ is arranged a pressure-roller $b^4$, which turns in spring-arms $b^5$ and which presses on the piled leaves so as to feed the leaves forward by the tapes $a$ at the moment when the stops $b^2$ are raised. The stop mechanism B is intermittently operated, so as to release the piled leaves, by means of a crank-arm $b^6$ and a lever-rod $b^7$, which extends along the supporting-frame F to a fulcrumed lever $b^8$, which is intermittently actuated by a cam $b^9$ on the intermediate shaft S' and a fulcrumed intermediate rod $b^{10}$, as shown in Figs. 20 and 21. At every rotation of the shaft S' the stop mechanism B is lifted and the piled leaves fed forward to the sewing-machine by the joint action of the tapes $a$ $a$ and roller $b^4$, they being then taken hold of by the feed mechanism of the sewing-machine and stitched in the usual manner along their center line. When the stops $b^2$ are lifted, the detained pile of sheets is fed forward for a very short distance to the sewing-machine, the feed mechanism of which coöperates with the tapes $a$ $a$ in drawing the sheets out from under the roller $b^4$ and said stops. The lifting action on the stops is for only a short time, for as soon as the sheets are taken hold of by the sewing-machine the stops rest on the pile of sheets and drop down on the table A when the sheets are drawn from under them, so as to be in position to detain the advancing pile of sheets. The lower end of the crank-arm $b^6$ is provided with a rubber cushion $b^\times$, that rests normally on the table B and that serves to take up and neutralize the concussion of the crank-arm with the table after each lifting motion of the stop mechanism B.

At both sides of the tapes $a$ $a$ are arranged adjustable gages $d$, (shown in Figs. 1 and 3,) which are arranged parallel with each other and with the tapes and which are laterally adjusted by their slotted shanks $d'$ and thumb-screws $d^2$ in suitable keepers $d^3$, according to the width of the piled leaves, so that they are guided according to their size in a reliable manner to the stitch-forming mechanism of the sewing-machine.

*The mechanism for applying the binding or covering material.*—As the piled leaves leave the stitching mechanism of the sewing-machine they are taken up by the pressure-rollers $e$ $e'$, which are arranged close to the guide-rollers $a^2$ $a^3$, as shown in the diagram Fig. 9, and which serve to apply the glue-coated binding or covering material to the back of the book, the pressure of the rollers $e$ $e'$ causing the binding material to adhere to the book. The pressure-rollers $e$ $e'$ are covered with rubber and are held apart by small helical springs. (Not shown.) They are supported in adjustable boxes, so that they can be set according to the thickness of the piled leaves to be stitched, the springs preventing them coming in contact, so that the glue on the binding or covering material is not transferred to the rollers $e$ $e'$ during the time when one book has passed between them and before the next book is taken up by them.

The binding or covering material $e^0$ is supplied to the pressure-rollers $e$ $e'$ from a suitable reel $e^2$, supported below the feed-tapes, and then passed over a guide-roller $e^3$ and tension-rods $e^4$ $e^5$ (shown in Figs. 2 and 9) to the rollers $e$ $e'$. The binding or covering material $e^0$ is conducted in its upward passage over a glue-transmitting roller $e^6$, to which rotary motion is imparted in the same direction as the binding or covering material by a belt and pulley transmission $e^7$ $e^8$ from the drive-roller of the intermediate set of endless tapes, said glue-roller turning in bearings of a tank E, in which the glue is kept in liquid condition by gas-jets $e^9$ or other equivalent means. The glue-roller $e^6$ is provided with a scraper $e^{10}$ at one side, which regulates the quantity of glue that is transferred to the binding or covering material, which is then conducted over the tension-rods $e^4$ $e^5$ and then brought with its glued side in contact with the back of the book, so as to cover the center stitches and as much of the cover as is required. The pressure-rollers $e$ $e'$ press the binding or covering material firmly on the back of the book and cause it to adhere firmly thereto. The pressure-rollers $e$ $e'$ receive an intermittent rotary or step-by-step motion by a sprocket-wheel and chain transmission $m^{10}$ $m^{11}$ $m^{12}$, (shown in Figs. 2, 6, 7, and 8,) by which the motion imparted to the drive-roller $a^4$ of the tapes $a$ $a$ is transmitted to the pressure-roller $e$, which again transmits its motion by gear-wheels $m^{13}$ to the lower pressure-roller $e'$. From the pressure-rollers $e\ e'$ the forward end of the book is fed toward and taken up by the intermediate sets of endless tapes $g\ g$. As soon as the rear end of the book leaves the pressure-rollers $e\ e'$ the stitching-threads and binding or covering material are subjected to the action of a cutting-off mechanism, by which they are cut off close to the rear edge of the book.

The cutting-off mechanism is shown in Figs. 1 and 2 and in detail in Figs. 12, 13, 14, and 15. It consists of a stationary lower knife $f$, supported on a bar $f^\times$, and a vertically-reciprocating upper knife $f'$, which latter is guided in ways $f^2$, that are supported on a transverse bar $f^3$. The movable knife $f'$ has an inclined edge, so as to produce a shear cut with the stationary knife $f$, and is connected by a helical spring $f^4$ with the upper end of the stationary arm $f^5$, that is attached to one of the ways $f^2$ of the movable knife. To the upper part of the movable knife $f'$ is applied an antifriction-roller $f^6$, which is intermittently acted on by a cam $f^7$, that is keyed to a shaft $f^8$, which receives oscillating motion by a crank $f^9$ and suitable actuating mechanism. The crank $f^9$ is supported by a rubber-cushioned arm $f^0$, that takes up the concussion of the crank on the return of the same into its normal position of rest. The actuating mechanism of the upper cutting-knife consists of a connecting-rod $f^{10}$, pivoted to the crank $f^9$, and a chain or wire cord $f^{11}$, which latter passes over suitable guide-pulleys $f^{12}$ to a fulcrumed lever $f^{13}$, the upper end of which is actuated by a cam-wheel $f^{14}$ on the intermediate shaft $S'$, as shown in Figs. 2, $2^a$, and 4, so that at each rotation of the shaft $S'$ the cutting mechanism is actuated and thereby the stitching-threads and the binding or covering material for the back cut off. The actuating mechanism for the cutting mechanism is so timed that the parts are cut off close to the rear end of the stitched book as the same is delivered by the pressure-rollers $e\ e'$.

In the drawings a narrow binding-strip is shown; but it is obvious that the binding or covering material may be made of varying width and even wide enough to cover the entire back of the book. When fully-covered books are desired, the cutting-off mechanism has to extend across the entire width of the machine, and it can be used for narrow or wide binding or covering material and for cutting off the covering of entire books, as required.

*The intermediate sets of endless tapes.*—The intermediate sets of endless tapes $g\ g$ are arranged for the purpose of moving the stitched book with the binding or covering material glued to its back forward for a certain distance, so as to produce the drying of the same before the book is subjected to the action of the folding devices. For this purpose two sets of endless tapes are arranged one above the other, as shown in Figs. 9 and $9^a$—namely, an upper and lower set—which are conducted over suitable carrying-rollers, consisting of drive-rollers $g'\ g'$, tension-rollers $g^2\ g^2$, and stretching-rollers $g^3\ g^3$, the adjacent parts of both set of tapes $g\ g$ being moved by means of the tension-rollers $g^2\ g^2$ in contact with each other excepting at the ingoing and outgoing ends of the tapes, so that the book is taken up by them and moved forward through the tapes to the opposite end of the same. Both sets of endless tapes $g\ g$ receive continuous motion from the drive-roller $g'$ of the lower set of tapes $g\ g$, which is rotated by the sprocket-wheel-and-chain transmission $v\ v'\ v^2$, said drive-roller transmitting by gear-wheels $g^4\ g^4$ rotary motion to the drive-roller $g'$ of the upper set of tapes $g\ g$. The stretching-rollers $g^3\ g^3$ at the outgoing ends of the two sets of tapes $g\ g$ are likewise provided with intermeshing gear-wheels $g^5\ g^5$, so that both sets of tapes are moved evenly forward with the stitched books held between them to the folding devices. During the forward motion of the books with the intermediate tapes the binding or covering material which is glued to the backs of the same becomes perfectly dry, so that the books can be subjected to the action of the folding devices.

As the books are moved along the outgoing ends of the tapes $g\ g$ they are guided along a laterally-adjustable gage $g^6$. As the books are delivered by the outgoing ends of the tapes $g\ g$ they are taken up by a third set of tapes $h$, which pass around a suitable driving-roller $h'$, stretching-roller $h^2$, and tension-rollers $h^3$. The driving-roller $h'$ receives rotary motion from the crossed sprocket-chain $v'$ and sprocket-wheel $v^4$, which carries at its inner end a gear-wheel $h^\times$, as shown in Fig. $1^a$. This gear-wheel meshes with a gear-wheel $h^0$ on the driving-roller $h'$, which imparts motion to the tapes $h$. The tapes $h$ serve to carry the books to the folding devices. Some of the tapes $h$ are twisted so as to impart to the books a tendency to be moved toward and along a side gage $h^4$, which is laterally adjustable by its slotted shanks $h^5$ and suitable clamping devices $h^6$ in such a manner that the center line of the books is moved in line with the center of the folding devices until the books are arrested by an adjustable stop $h^7$, that extends transversely across the tapes $h$, as shown in Fig. $1^a$, ready to be taken up by the folding devices.

*The folding devices.*—The folding devices are shown in plan view in Fig. $1^a$ and in detail views in Figs. 4, 5, $5^a$, 16, 17, 18, and 19. They consist of a vertically-reciprocating folding-blade $l^2$, an upper pair of smaller rollers $l$, and a lower pair of larger rollers $l'$, which are arranged and parallel with the endless tapes $h$. The journal-bearings of the upper pair of rollers $l$ are adjustable by screw-rods $l^4$ in a horizontal guide-frame $l^3$, as shown in Fig. 17, so as to be set to the proper distance from each other, according to the thickness of the book to be folded. The journal-bearings of the lower rollers $l'$ are likewise adjustable by screws $l^6$ in their guide-frame $l^5$, as shown in Figs. 16 and 17, so as to be set to the required distance from each other, which, however, is to be smaller than the distance to the upper rollers $l$, so that the folded book as it is fed downward from the upper rollers to the lower rollers is tightly pressed together by the latter and thereby finally folded. The book is centrally folded by a blade $l^2$, by which it is moved in downward direction and delivered to the upper pair of rollers $l$. The folding-blade $l^2$ is mounted on the upper bars $l^7$ of two transverse vertically-reciprocating frames. The folding-blade $l^2$ is arranged parallel with the longitudinal axis of the machine and vertically in line with the center of the stitched book as the same is moved by the tapes $h$ along the gage $h^4$, Fig. 1ª, so that the downward motion of the blade will fold the book and force it in downward direction into the space between the upper pair of rollers $l$.

The vertically-reciprocating frames on which the folding-blade is mounted are formed of transverse top and bottom bars $l^7$ $l^8$ and vertical side rods $l^9$, which are guided in sleeves $l^{10}$, attached to the supporting-frame F. Each transverse bottom bar $l^8$ is provided with an antifriction-roller $l^{11}$, close to the bar, and with a second antifriction-roller $l^{12}$, that is carried by a downwardly-extending rod $l^{13}$, which is guided in a stationary sleeve $l^{14}$. The antifriction-rollers $l^{11}$ and $l^{12}$ move in contact with cams $l^{15}$ and $l^{16}$ on the shaft S', as shown in detail in Fig. 19, said cams being so formed that vertically-reciprocating motion is imparted at the proper time to the folding-blade $l^2$, so as to produce the center folding of the stitched book fed to the folding devices. The upward motion is imparted to the blade-carrying frames $l^7$ $l^8$ $l^9$ by the larger cams $l^{15}$, while the downward motion is imparted thereto by the smaller cams $l^{16}$, the frames being moved from the position shown in full lines in Fig. 19 into the lower position shown in dotted lines and then upward again, and so on alternately as required. The cams $l^{15}$ $l^{16}$ impart a positive upward and downward motion to the folding-blade at the proper time, so that the book is forced downward along its center line by the descending folding-blade into the space between the upper pair of rollers $l$ and then taken up by the same and transmitted to the lower pair of rollers $l'$, which firmly press and fold the book and deliver it to an inclined chute N, below the rollers $l'$, along which chute it is conducted into a receptacle R, as shown in Figs. 1ª and 4.

Rotary motion in the proper direction is imparted to the upper and lower pairs of rollers $l$ and $l'$ by a gear-wheel transmission $n'$ $n^2$ $n^3$ $n^4$ $n^5$ $n^6$ $n^7$. (Shown in Figs. 5 and 5ª.) The gear-wheel $n'$ is placed on the shaft of the gear-wheel $m^{22}$ and serves to drive the intermediate gear-wheels and rollers in the direction of the arrows. (Shown in Figs. 5ª and 4.) The shafts of the gear-wheels $n^2$ $n^3$ $n^4$ are supported in bearings of two link-frames $n^8$, which are applied to the shaft of the gear-wheel $m^{22}$, as shown in Fig. 5ª, and which serve to keep the intermediate gear-wheels $n^2$ $n^3$ in proper mesh with the gear-wheels $n'$ $n^4$ and with the gear-wheel $n^5$, by which rotary motion is transmitted to the gear-wheels $n^6$ and $n^7$ on the shafts of the upper pair of rollers $l$. When the main shaft S is set in motion, the rollers $l$ and $l'$ are continuously rotated, independent of the motion of the other devices which are actuated by the intermediate shaft S' and the transverse shaft $S^2$. The link-frames $n^8$, by which the intermediate roller-driving gear-wheels are supported, serve to adjust the latter to the relative positions of the rollers $l$ $l'$ after they are adjusted to the thickness of the book to be folded, so as to secure the reliable transmission of motion to the same.

Whenever it is desired to stop the machine in case any part of the same should get out of order or not perform its function properly, a treadle T on the left-hand side of the table A below the side extension A' is depressed, and thereby the fulcrumed lever $t$ operated, which acts on the lower arm of a fulcrumed elbow-lever $t'$, whose upper arm is connected with a spring-actuated rod $t^2$, the rear end of which engages a clutch $t^3$, engaging the hub of the fly-wheel, so as to throw the main shaft S into clutch with the fly-wheel W, whereby all the parts receive motion from the main shaft S. The treadle T is locked into depressed position by a spring-actuated latch-lever T'. (Shown in Fig. 3.) When the latch-lever T' is released from the treadle, the spring of the rod $A^2$ throws the shaft S and fly-wheel W out of clutch, so that the machine is stopped. At the right-hand side of the table A is arranged a pivoted lever $o$, which engages a clutch $o'$ on the shaft of the sprocket-wheel $w^4$, said clutch throwing said shaft in or out of mesh with the sprocket-wheel-and-chain transmission $w^6$ $w^7$ $w^8$ of the sewing-machine M, so as to start or stop the same. On stopping the machine the operator is enabled to turn the shaft $m$ of the sewing-machine by hand in order to thread the needle and shuttle and get the machine ready for work. By the treadle mechanism the book-stitching machine is at any moment completely under the control of the operator, who sits at the ingoing end of the same and controls from there the entire machine. He places the piled-up leaves that are supplied to him onto the feed-tapes $a$ and keeps up the supply, so that the intermittent stitching of the piled leaves, the gluing on of the binding or covering material to the back of the same, the cutting off the stitching-threads and binding or covering material, and the folding of the stitched book are obtained at the proper time, the different steps in making the book being illustrated by Figs. 22, 23, and 24, in which a stitched pile of leaves, a book shown in the act of being folded, and a finished book are respectively shown. The latter is trimmed off at the edges, by which also the projecting threads and the ends of the binding-strip are cut off.

By my improved machine it is possible to produce center-stitched books of all kinds and of any thickness or size in a very quick and reliable manner at a considerable saving in time and labor, for the reason the high-priced labor which was heretofore required for making these books is to a great extent dispensed with.

Having thus described my invention, what I claim is—

1. The combination, with an organized sewing-machine, of a primary set of feed-tapes on which the pile of sheets is placed, a stop device for holding the sheets until the sewing-machine is ready to receive the same, a spring-pressed roller for pressing on the sheets when the stop device is lifted, and means for simultaneously raising the stop device and lowering the roller, said means being operatively connected with the sewing-machine, substantially as set forth.

2. The combination, with an organized sewing-machine, of a primary set of feed-tapes on which the pile of sheets is placed, adjustable gages at both sides of said tapes, a stop device near the outgoing ends of said feed-tapes for holding the sheets before they are fed to the stitching devices, means for raising said stop device, and means back of the stop device adapted to press on the sheets when the stop device is raised, for producing the forward motion of the sheets to the stitching devices, substantially as set forth.

3. The combination, with an organized sewing-machine, of a primary set of tapes for feeding the pile of sheets to said sewing-machine, means for imparting an intermittent or step-by-step forward motion to said feed-tapes, a stop near the outgoing ends of said feed-tapes for arresting the sheets in front of the sewing-machine, means for intermittently raising said stop, and means for pressing on the sheets when the stop is raised, substantially as set forth.

4. The combination, with an organized sewing-machine, of a primary set of feed-tapes for feeding the pile of sheets to the sewing-machine, and a pair of pressure-rollers for taking up the stitched sheets, and means for imparting an intermittent or step-by-step motion to said pressure-rollers and feed-tapes, substantially as set forth.

5. The combination with an organized sewing-machine, of a primary set of feed-tapes, a pair of pressure-rollers at the end of said feed-tapes, means for imparting to the tapes and pressure-rollers an intermittent or step-by-step forward motion corresponding to the motion of the stitching devices, a stop for holding the sheets before they are fed to the stitching devices, a spring-pressed roller, and means for raising or lowering the stop and simultaneously lowering or raising the spring-roller, substantially as set forth.

6. The combination, with an organized sewing-machine, of a primary set of tapes for feeding a set of sheets forward, means for imparting intermittent or step-by-step motion to said tapes, means for pressing on said sheets for feeding them to the sewing-machine, an intermittently-actuated stop for arresting the pile of sheets before it is fed to the sewing-machine, intermittently-actuated pressure-rollers at the end of the feed-tapes for taking up the stitched books, means for feeding a glue-coated binding or covering material to the pressure-rollers for applying it to the back of the book, and a cutting mechanism for cutting off the stitching-threads and the covering material after the stitched book has passed the pressure-rollers, substantially as set forth.

7. The combination, with an organized sewing-machine, means for feeding a pile of sheets to said sewing-machine, means for applying the binding or covering material to the back of the stitched sheets, a cutting-off mechanism for cutting off the stitching-threads and covering material at the proper time, means for imparting to the primary feeding mechanism of the sheets and to the covering material an intermittent or step-by-step motion, an intermediate double set of feed-tapes, means for imparting continuous forward motion to said intermediate double set of feed-tapes for conducting the same forward for some distance for permitting the drying of the covering material, substantially as set forth.

8. The combination, with an organized sewing-machine, of a primary set of tapes for feeding the sheets to the sewing-machine, means for pressing on the same, a pair of pressure-rollers at the end of the primary feed-tapes, means for feeding the glue-coated binding or covering material to the pressure-rollers, and a cutting mechanism located in front of the pressure-rollers for cutting off the stitching-threads and covering material at the proper time, substantially as set forth.

9. The combination, with an organized sewing-machine, of a primary set of tapes for feeding the pile of sheets to the sewing-machine, means for pressing on said sheets, pressure-rollers for taking up the stitched sheets, means for supplying the glue-coated binding or covering material to the pressure-rollers for applying it to the pile of sheets, and a cutting-off mechanism for cutting off the stitching-threads and covering material at the proper time, said cutting-off mechanism being composed of a stationary knife, a vertically-guided and spring-actuated knife and mechanism for lowering said knife at the proper time, substantially as set forth.

10. The combination, with an organized sewing-machine, of a primary set of tapes for feeding the pile of sheets forward, an intermittently-actuated spring-pressed roller pressing on the sheets, pressure-rollers for taking up the sheets after they are stitched, means for supplying the glue-coated binding or covering material to the pressure-rollers for supplying it to the back of the sheets, mechanism for intermittently cutting off the stitching-threads and covering material, an intermediate double set of tapes for conducting the book forward, a third system of tapes, guide-rails along the intermediate and third set of tapes, and folding devices located parallel with the third set of tapes for folding the stitched book at the center line, substantially as set forth.

11. The combination with an organized sewing-machine, of a primary set of tapes for moving the pile of sheets to said sewing-machine, an intermittently-actuated stop device for arresting the sheets until ready to be fed to the sewing-machine, means for pressing on the sheets and feeding them to the sewing-machine, pressure-rollers at the end of the primary set of tapes, means for feeding a glue-coated binding or covering material to the pressure-rollers for applying it to the back of the book, a cutting mechanism for cutting off the stitching-threads and covering material at the proper time, an intermediate double system of feed-tapes for conducting the stitched book forward, a third system of tapes forming a continuation of the intermediate set, guide-rails extending along the second and third set of tapes, and folding devices arranged parallel with and intermediately between the third system of feed-tapes, substantially as set forth.

In testimony that I claim the foregoing as my invention I have signed my name in presence of two subscribing witnesses.

ALWIN VON AUW.

Witnesses:
PAUL GOEPEL,
GEO. W. JAEKEL.